（12）United States Patent
Wauke et al.

(10) Patent No.: US 6,456,453 B1
(45) Date of Patent: Sep. 24, 2002

(54) MAGNETIC DISK DRIVE IN WHICH A BODY INCLUDING A CHASSIS IS ROTATABLE WITH REFERENCE TO A LOCATION DISPLACED FROM THE CENTER OF GRAVITY OF THE BODY

(75) Inventors: Tomokuni Wauke; Akihito Yamamoto; Koji Mizuta, all of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 31 days.

(21) Appl. No.: 09/596,910

(22) Filed: Jun. 20, 2000

(30) Foreign Application Priority Data

Jun. 21, 1999 (JP) .......................................... 11-174334

(51) Int. Cl.[7] .............................................. G11B 33/14
(52) U.S. Cl. ................................................... 360/97.02
(58) Field of Search ..................................... 360/97.02

(56) References Cited

U.S. PATENT DOCUMENTS 5,081,551 A  * 1/1992 Aruga ..................... 360/97.01
5,243,479 A    9/1993 Nakagoshi et al.
5,400,196 A    3/1995 Moser et al.
5,777,821 A    7/1998 Pottebaum
6,275,352 B1 * 8/2001 Tadepalli ................. 360/97.02

FOREIGN PATENT DOCUMENTS

| EP | 0 341 957 A2 | 11/1989 |
| EP | 0 381 408 A1 | 8/1990 |
| EP | 0 419 345 A2 | 3/1991 |
| EP | 0 567 833 A2 | 11/1993 |
| JP | 2-50383 | 2/1990 |

* cited by examiner

Primary Examiner—A. J. Heinz
(74) Attorney, Agent, or Firm—Brinks Hofer Gilson & Lione

(57) ABSTRACT

A magnetic disk drive includes a body having a chassis formed of a flat plate, and at least a spindle motor and a head carriage that are mounted to the chassis. A bottom cover is mounted to cover the chassis, and a holding mechanism (such as a screw) to hold the chassis and the bottom cover. The holding mechanism is disposed on a support line which extends perpendicular to a line passing through the center of gravity of the body extending in a direction of movement of the head carriage and which is displaced from the center of gravity of the body. The body is rotatable with respect to the bottom cover, with the support line as an axis.

13 Claims, 15 Drawing Sheets

MAGNETIC DISK DRIVE IN WHICH A BODY INCLUDING A CHASSIS IS ROTATABLE WITH REFERENCE TO A LOCATION DISPLACED FROM THE CENTER OF GRAVITY OF THE BODY

BACKGROUND OF THE INVENTION

1. Field of the Invention

The present invention relates to a magnetic disk drive used in, for example, an external storage device of a computer.

2. Description of the Related Art

A conventional magnetic disk drive is described. FIG. 14 is a plan view schematically showing the conventional magnetic disk drive. FIG. 15 is a right side view of the main portion as viewed in the direction of arrow XIV in FIG. 14, in which a chassis and a bottom cover in the conventional magnetic disk drive are in an assembled state. FIG. 16 is a plan view of the bottom cover in the conventional magnetic disk drive. FIG. 17 shows measured values obtained when a body of the conventional magnetic disk drive is resonating.

In FIGS. 14 to 16, a chassis 31 is a thin iron plate, and comprises a flat section 31a which is a substantially rectangular flat surface, side walls 31b1 and 31b2 formed vertically from both longer sides of the flat section 31a, and a side wall 31c formed by erecting vertically a portion of one of the shorter sides of the flat section 31a. Near a boundary between the flat section 31a and the side wall 31b 1, recess-shaped holding sections 32 which are recessed from the flat section 31a are formed at two locations in a longitudinal direction of the chassis 31. Similarly, near a boundary between the side wall 31b 2 and the flat section 31a, recess-shaped holding sections 32 are formed at two locations in the longitudinal direction of the chassis 31. The sets of two holding sections 32 near the two boundaries of the chassis 31 are disposed parallel to each other with 1respect to a center line X3—X3 extending in the longitudinal direction of the chassis 31.

Each holding section 32 includes a tapering section 32a and a pedestal 32b which is a top portion formed continuously with its corresponding tapering section 32a and formed parallel to the flat surface corresponding to the flat section 31a, with a through hole 32c passing vertically through substantially the center of its corresponding pedestal 32b.

A head transporting device 33 comprises a head carriage 34 including a head arm for carrying a magnetic head (not shown) at an end thereof, a guide shaft 35 which is inserted into the head carriage 34, and a stepping motor 36 to which one end of the guide shaft 35 is fitted. The stepping motor 36 allows the head carriage 34 to move in the longitudinal direction of the chassis 31. The head transporting device 33 which is inserted into a hole (not shown) formed in the side wall 31c is secured to the chassis 31 using a desired securing means such as screwing.

A spindle motor 37 is mounted to the flat section 31a of the chassis 31 from below using a desired mounting means such as screwing. Although not shown, other component parts are mounted to the chassis 31 to form a body A1.

As shown in FIG. 16, a bottom cover 38 is a thin iron plate, and comprises a bottom plate 38a which is a substantially rectangular flat surface, and side walls 38b1 and 38b2 formed vertically from both longer sides of the bottom plate 38a. Near a boundary between the bottom plate 38a and the side wall 38b1, protruding holding sections 39 formed by indenting portions of the bottom plate 38a from the bottom side to the top side are formed at two locations in a longitudinal direction of the bottom cover 38. Similarly, near a boundary between the side wall 38b2 and the bottom plate 38a, protruding holding sections 39 are formed at two locations in the longitudinal direction. The sets of two holding sections near the two boundaries of the bottom plate 38a are disposed parallel to each other with respect to a center line X4—X4 extending in the longitudinal direction.

Similarly to each holding section 32 of the chassis 31, each holding section 39 includes a tapering section 39a and a pedestal 39b which is a top portion formed continuously with its corresponding tapering section 39a and formed parallel to the flat surface of the bottom plate 38a, with a hole 39c passing vertically through substantially the center of its corresponding pedestal 39b.

As shown in FIG. 15, the bottom cover 38 is mounted to the chassis 31 so as to cover the bottom side of the chassis 31 and so as to make the pedestal 32b of each holding section 32 of the chassis 31 contact, that is, abut against the pedestal 39b of each holding section 39 of the bottom cover 38. This causes the hole 39c in each holding section 39 of the bottom cover 38 and the hole 32c of each holding section 32 of the chassis 31 to be in a connected state. Holding means, such as screws 40, are inserted into the holes 39c and the corresponding holes 32c in the connected state in order to secure the bottom cover 38 and the chassis 31 together. Accordingly, the bottom cover 38 is completely secured to the chassis 31 at four locations with the screws. By mounting the bottom cover 38 to the body A1, the magnetic disk drive is constructed.

The magnetic disk drive is used as an external storage device of a computer, such as a desktop PC, and is placed in various external environmental conditions. It functions to perform read/write operations with a magnetic head which sandwiches a magnetic floppy disk from both sides thereof.

Therefore, when the magnetic disk drive is vibrated by changes in some external environmental condition, the vibration acts on the magnetic head through the head carriage, so that the read/write operations may be affected in some way.

Here, as shown in FIG. 17, an evaluation of the vibration of the body A1 was carried out by vibrating the entire conventional magnetic disk drive and changing the oscillation frequency thereof using a measuring device called a servo analyzer. In FIG. 17, the vertical axis represents a ratio in which an output acceleration a1 of the body A1 is divided by an input acceleration a2 to the magnetic disk drive (a1/a2), and the horizontal axis represents the oscillation frequency (in Hz).

According to FIG. 17, at input frequencies of 230 Hz and 317 Hz, the a1/a2 level become steep and reach peak points. From FIG. 17, it can be seen that the body A1 resonates when the outside vibration has vibration frequencies of 230 Hz and 317 Hz.

As can be understood from the foregoing description, in the conventional magnetic disk drive, the chassis 31 and the bottom cover 38 are completely secured together by the four holding sections 32 of the chassis 31 and the four holding sections 39 of the bottom cover 38, so that any vibration and shock exerted to the bottom cover 38 from the outside are directly transmitted to the body A1. Therefore, as shown in FIG. 17, resonance occurs at 200 to 350 Hz. When the body A1 resonates, the spindle motor 37, the head carriage 34, and the like are adversely affected, so that, for example, variations in rotation occur therein. In particular, the head carriage 34 itself has a natural resonance mode near 300 Hz, so that the head carriage 34 is greatly affected, causing a side of the head arm where the magnetic disk is gripped to open, resulting in read/write operation errors.

SUMMARY OF THE INVENTION

Accordingly, it is an object of the present invention to make it possible to effectively reduce externally applied vibration and shock by making a body comprising a chassis to which component parts are mounted rotatable with reference to a location situated away from the center of gravity of the body.

To this end, according to the present invention, there is provided a magnetic disk drive comprising:

- a body including a chassis formed of a flat plate and at least a spindle motor and a head carriage that are mounted to the chassis;
- a bottom cover mounted so as to cover the chassis; and
- holding means for holding the chassis and the bottom cover;
- wherein the holding means is disposed on a support line which intersects at right angles a line passing through the center of gravity of the body and extending in a direction of movement of the head carriage, the support line being displaced from the center of gravity of the body; and
- wherein the body is rotatable with respect to the bottom cover, with the support line serving as an axis.

Two such holding means may be provided at two locations on the support line, with the line passing through the center of gravity being disposed therebetween.

The holding means may be symmetrically disposed at the two locations with respect to the line passing through the center of gravity.

The holding means may be disposed on the support line displaced at a spindle motor side.

The magnetic disk drive comprising the holding means may further comprise a resilient member for absorbing shock at the chassis, wherein, at a location displaced from the support line, the resilient member is disposed between the chassis and the bottom cover.

The magnetic disk drive comprising the holding means may further comprise a resilient member for absorbing shock produced at the chassis, wherein, at a location displaced from the support line, the resilient member is disposed at a head carriage mounting side between the chassis and the bottom cover.

The magnetic disk drive comprising the holding means may be such that the resilient member performs an urging operation in a direction in which the bottom cover and the chassis are separated from each other or in a direction in which the bottom cover and the chassis are brought toward each other.

The magnetic disk drive comprising the holding means may further comprise restricting means for restricting a rotational movement of the chassis, with the holding means serving as a fulcrum.

The magnetic disk drive comprising the holding means may be such that the restricting means comprises a hole formed in either one of the bottom cover and the chassis and a protrusion formed in either of the other of the bottom cover and the chassis.

The magnetic disk drive comprising the holding means may be such that, in the direction of movement of the head carriage, the chassis while being tilted with respect to the bottom cover, is held by the holding means, and the tilted chassis while being displaced is stopped by the restricting means for restricting a rotational motion of the chassis with the holding means as a fulcrum.

The magnetic disk drive comprising the holding means may be such that either the chassis or the bottom cover includes a first pedestal having an inclined surface formed at a top portion thereof; the holding means is situated at the first pedestal; and either the chassis or the bottom cover is brought into contact with the inclined surface in order to dispose the chassis in a tilted state with respect to the bottom cover.

The magnetic disk drive comprising the holding means may be such that two such first pedestals are provided at two locations on the support line, with the line passing through the center of gravity being disposed therebetween The magnetic disk drive comprising the holding means may be such that either the chassis or the bottom cover includes a second pedestal having a top surface which is parallel to a flat surface of either the chassis or the bottom cover; the holding means is situated at the second pedestal; on the support line, the second pedestal is disposed on one side of the line passing through the center of gravity, and the first pedestal is disposed on the other side of the line passing through the center of gravity; either the chassis or the bottom cover is brought into contact with the inclined surface and the top surface in order to hold the chassis and the bottom cover by the holding means; and the magnetic disk drive further comprises a resilient member for absorbing shock at the chassis, in which, at a location separated from the second pedestal between the chassis and the bottom cover, the resilient member is disposed towards the second pedestal from the line passing through the center of gravity.

DESCRIPTION OF THE PREFERRED EMBODIMENT

Figure 1:
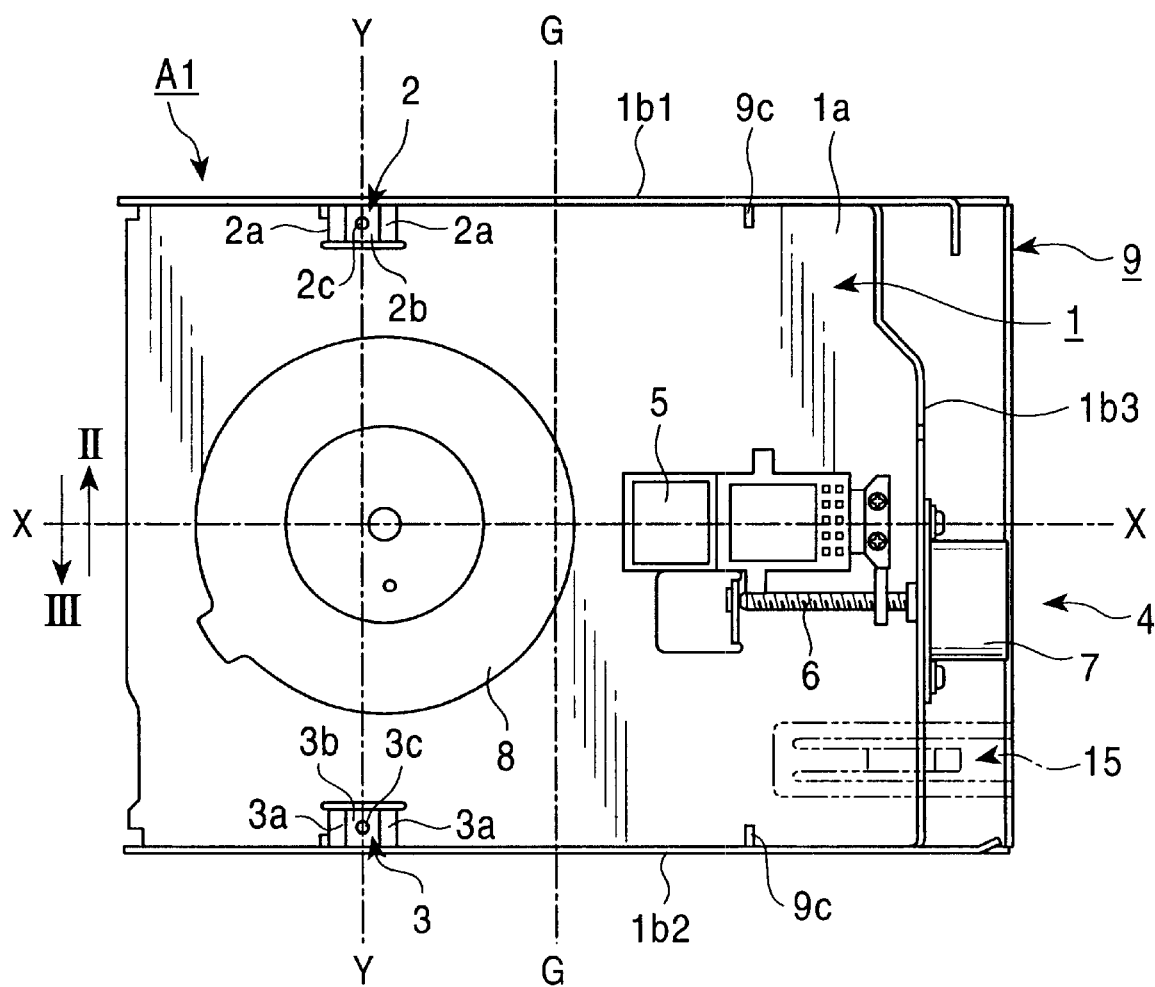
FIG. 1 is a plan view schematically showing a magnetic disk drive in accordance with the present invention.
Figure 2:
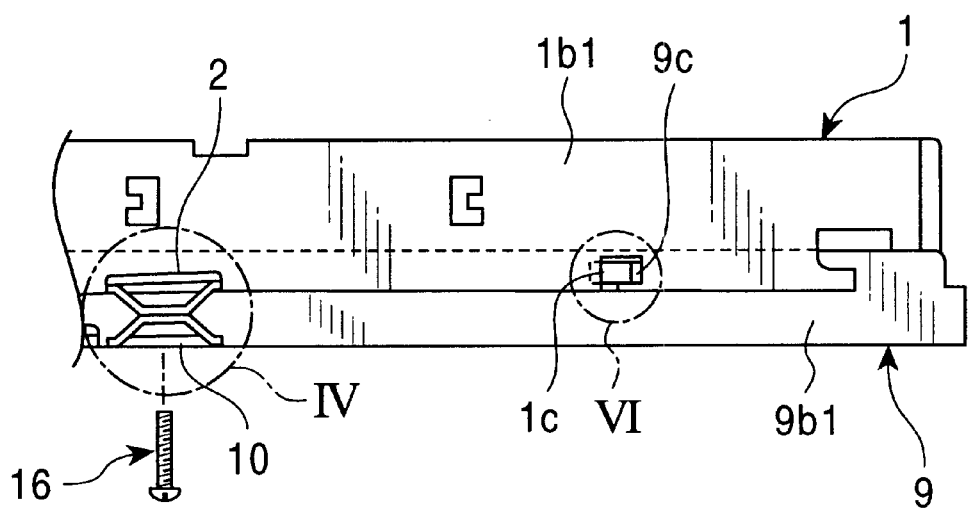
FIG. 2 is a left side view of the main portion as seen from the direction of arrow II in FIG. 1, wherein a chassis and a bottom cover of the magnetic disk drive in accordance with the present invention are in an assembled state.
Figure 3:
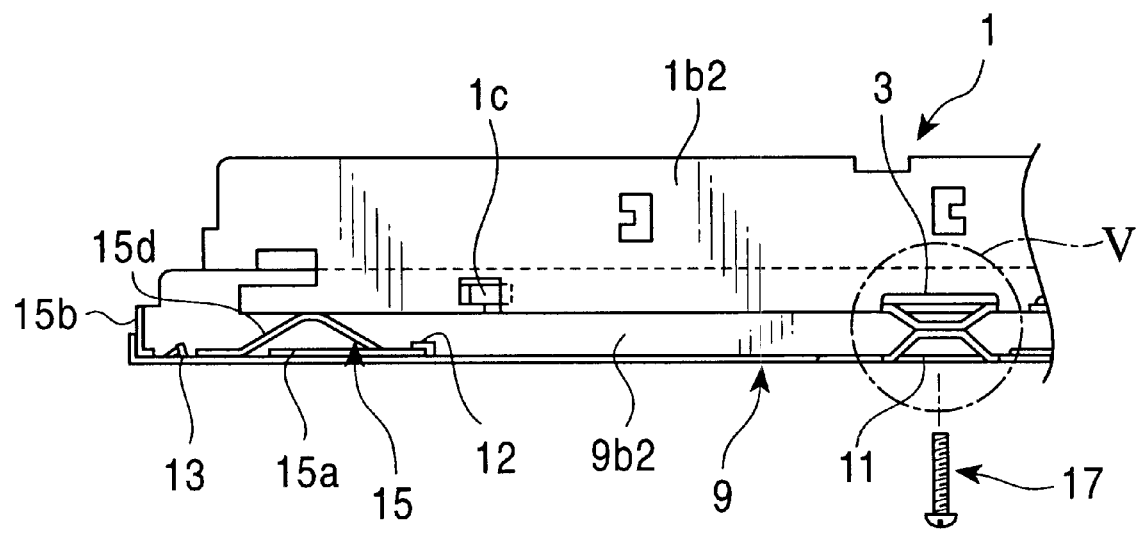
FIG. 3 is right side view of the main portion as seen from the direction of arrow III in FIG. 1, wherein the chassis and the bottom cover of the magnetic disk drive in accordance with the present invention are in an assembled state.
Figure 4:
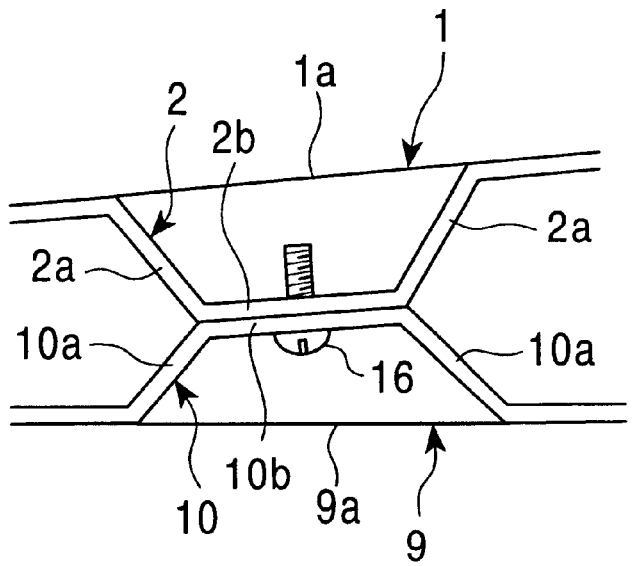
FIG. 4 is an enlarged view of a portion enclosed in a circle IV of FIG. 2.
Figure 5:
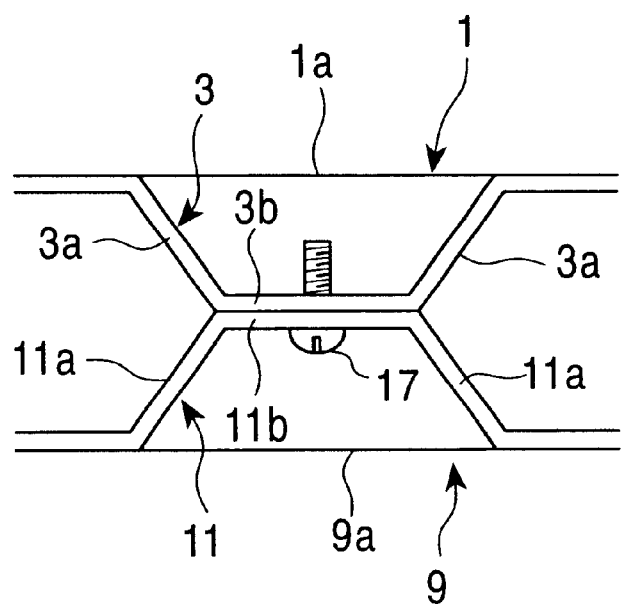
FIG. 5 is an enlarged view of a portion enclosed in a circle V of FIG. 3.
Figure 6:
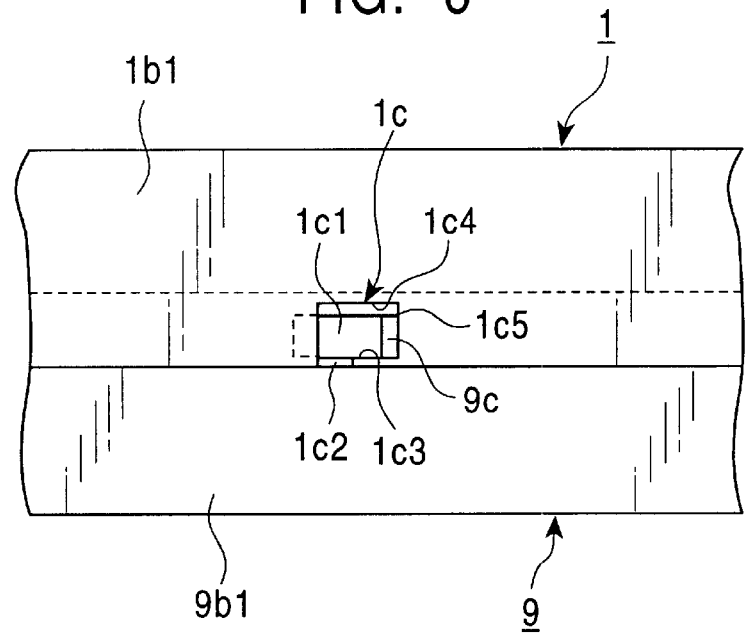
FIG. 6 is an enlarged view of a portion enclosed in a circle VI of FIG. 2.
Figure 7:
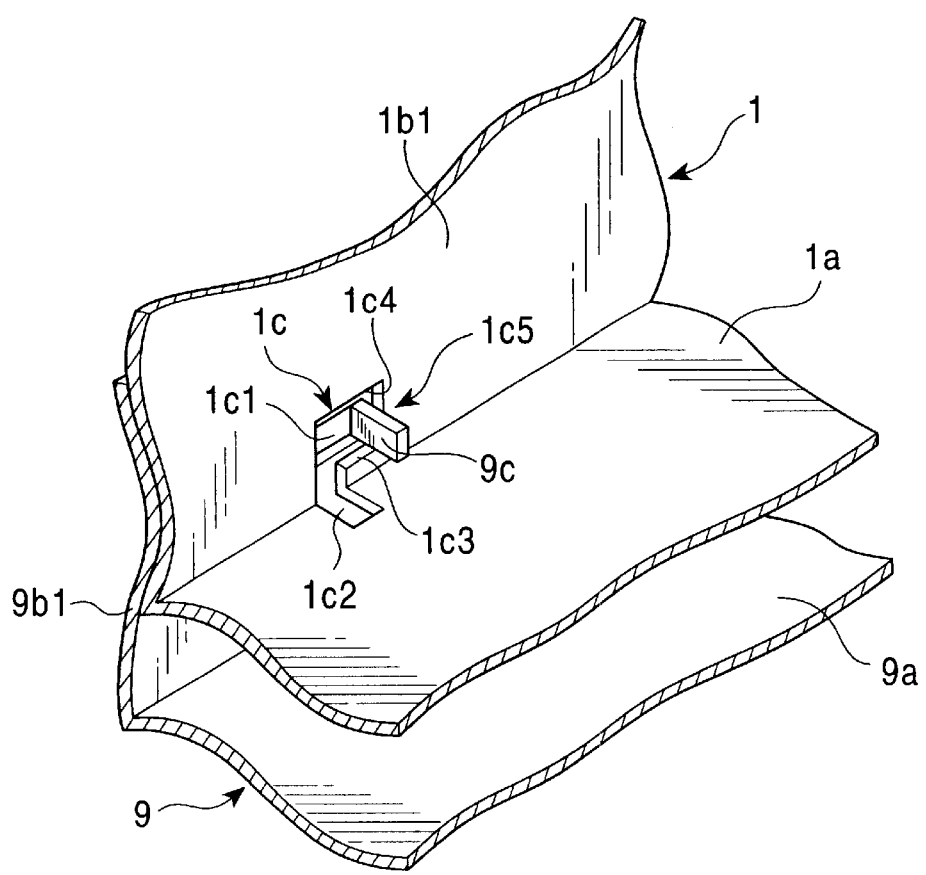
FIG. 7 is a perspective view of FIG. 6.
Figure 8:
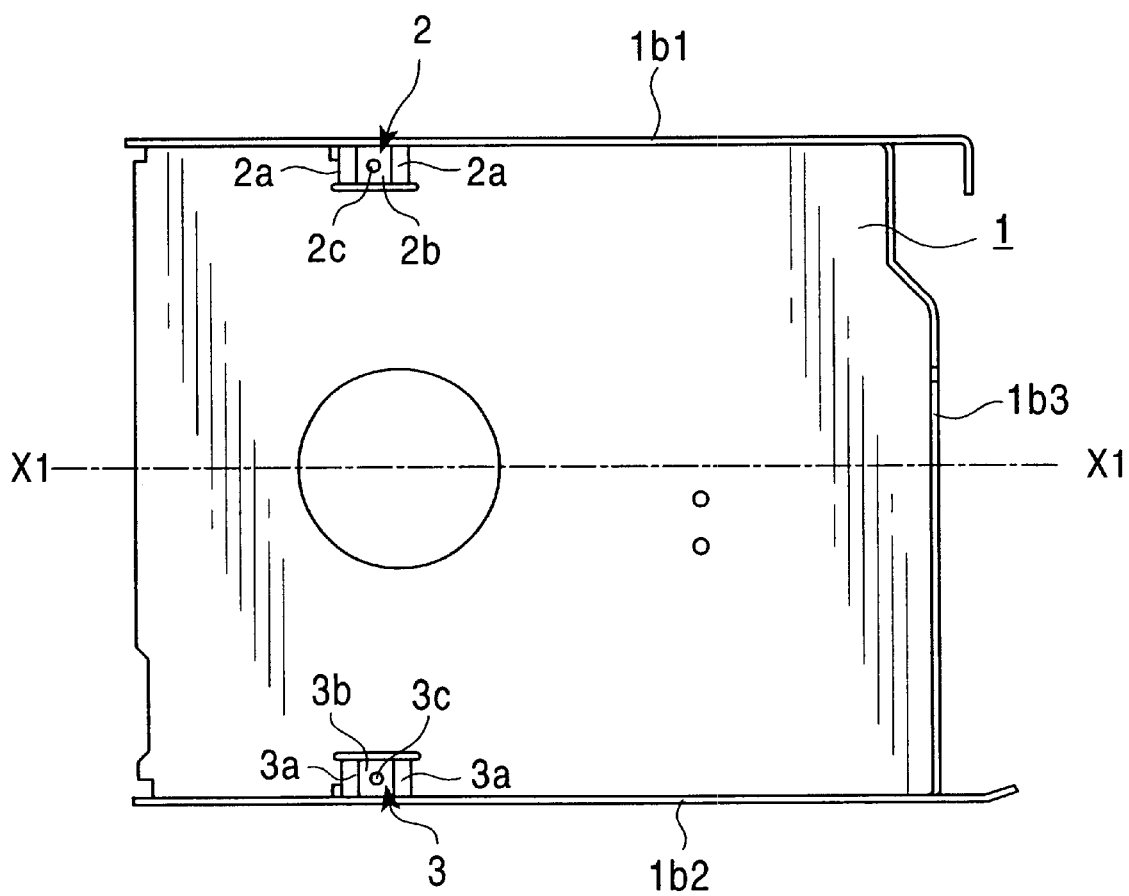
FIG. 8 is a plan view of the chassis of the magnetic disk drive in accordance with the present invention.
Figure 9:
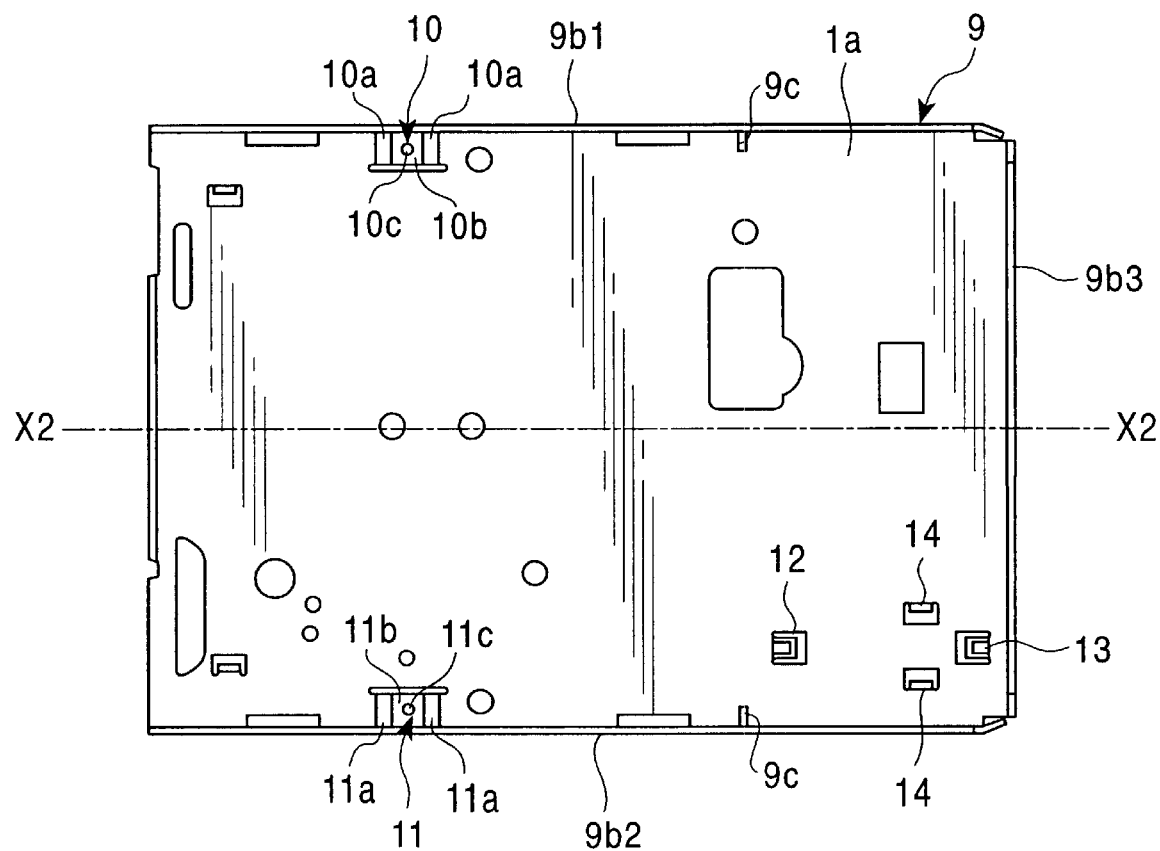
FIG. 9 is a plan view of the bottom cover of the magnetic disk drive in accordance with the present invention.
Figure 10:
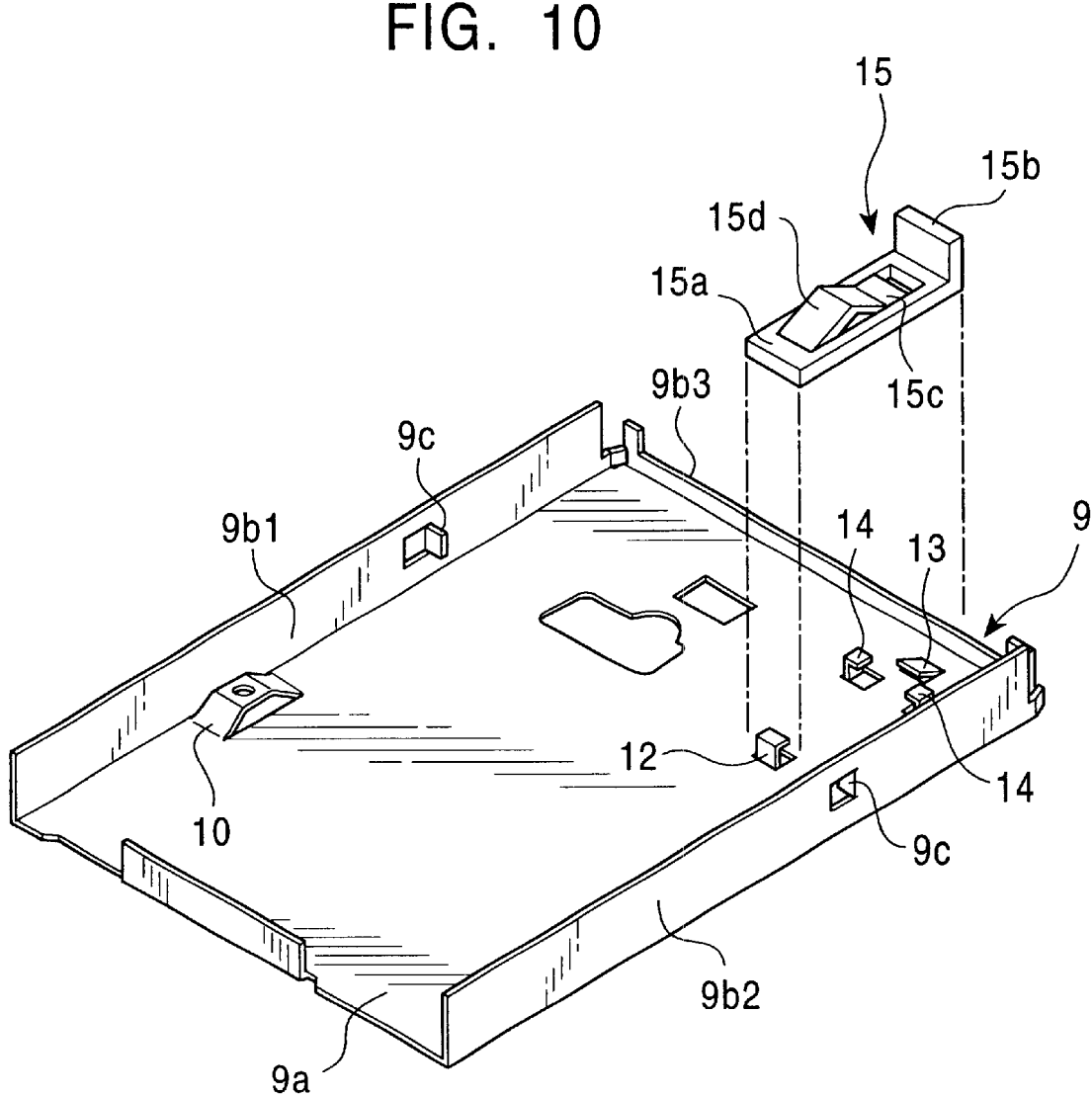
FIG. 10 is a perspective view of the bottom cover of the magnetic disk drive in accordance with the present invention.
Figure 11:
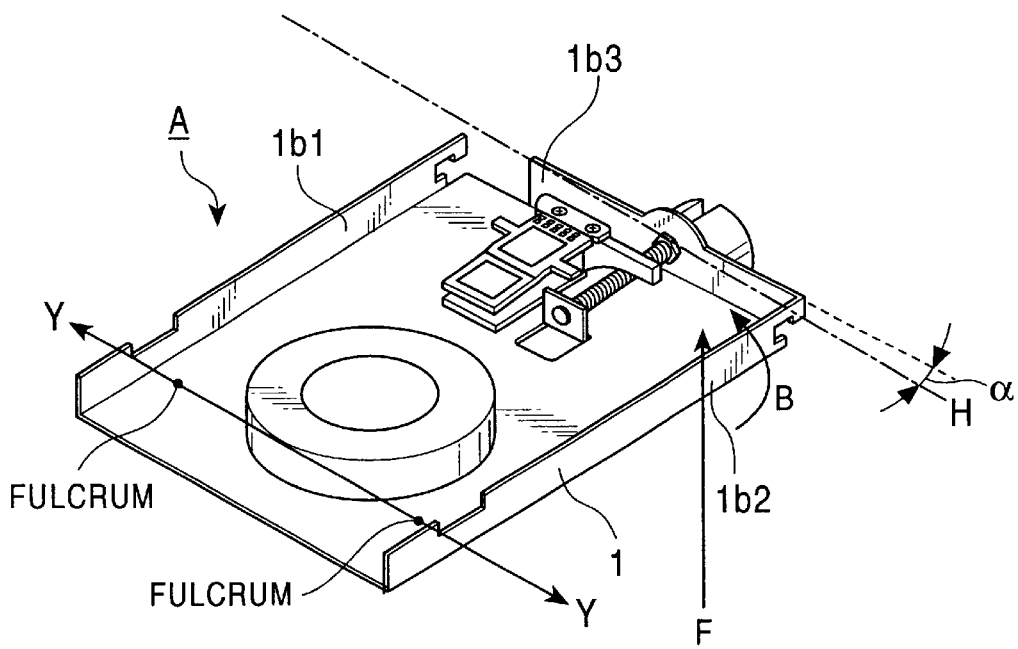
FIG. 11 illustrates a twisted state of the chassis of the magnetic disk drive in accordance with the present invention.
Figure 12:
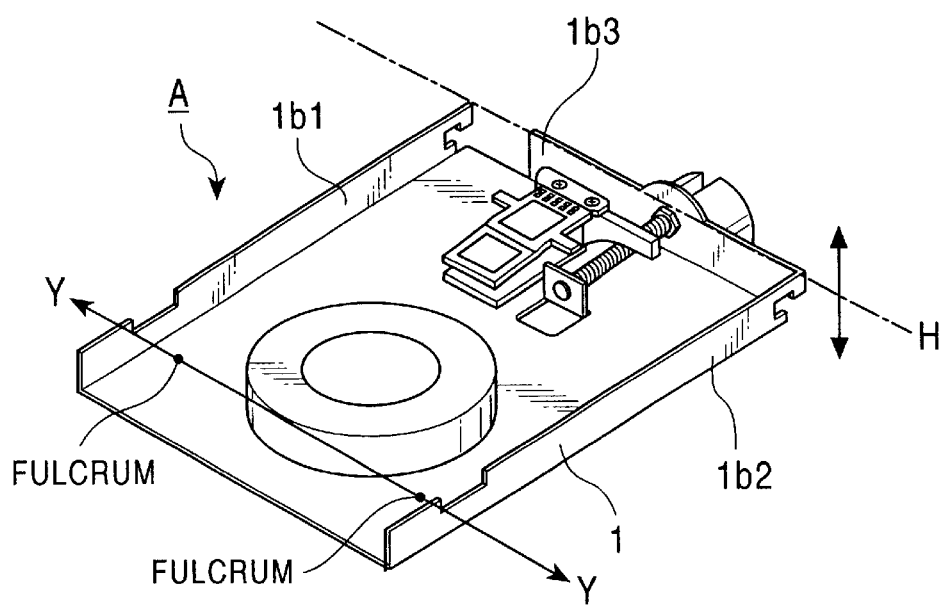
FIG. 12 illustrates a state in which the chassis of the magnetic disk drive in accordance with the present invention is parallel to a horizontal line H.
Figure 13:
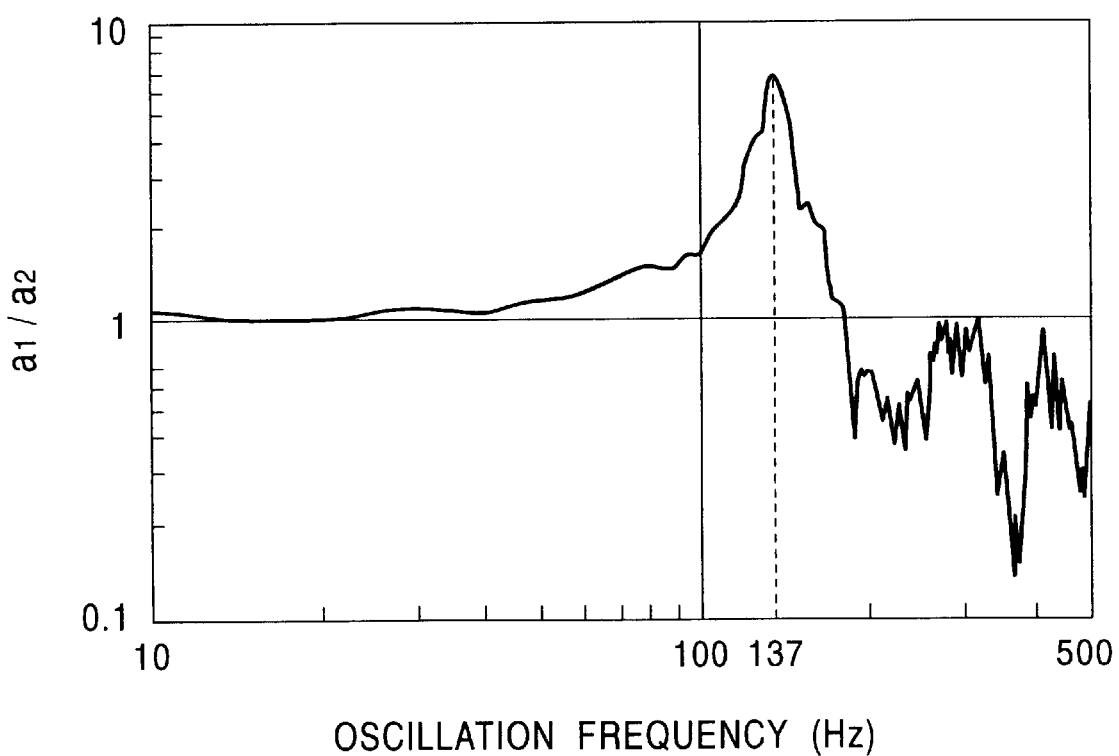
FIG. 13 shows measured values obtained when a body of the magnetic disk drive in accordance with the present invention is resonating.
Figure 14:
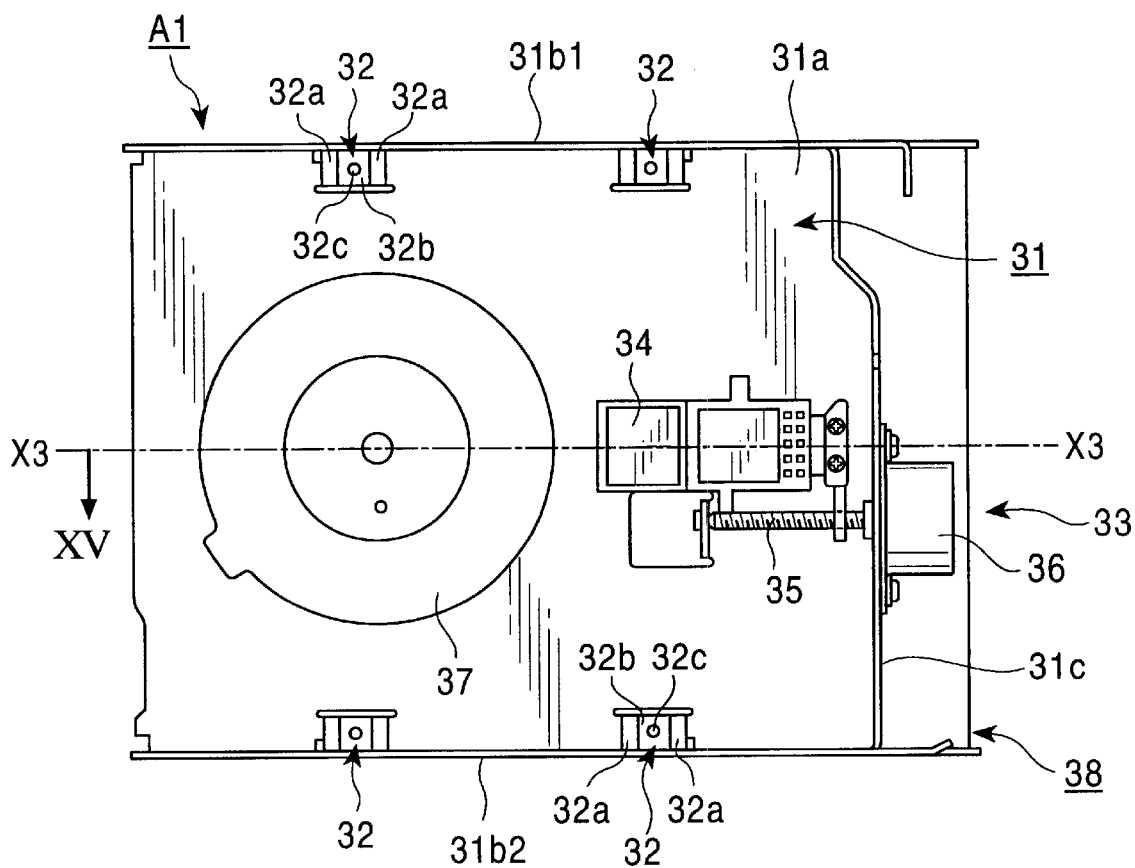
FIG. 14 is a plan view schematically showing a conventional magnetic disk drive.
Figure 15:
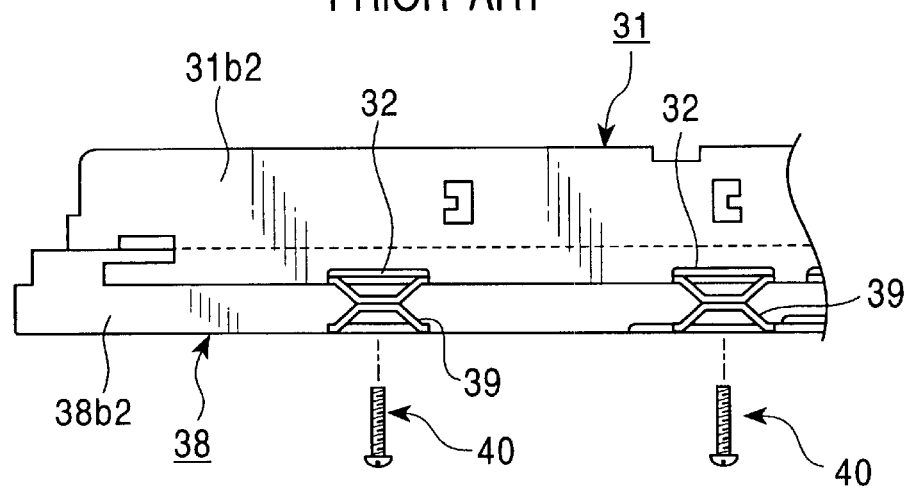
FIG. 15 is a right side view of the main portion as seen from the direction of arrow XIV in FIG. 14, in which a chassis and a bottom cover in the conventional magnetic disk drive are in an assembled state.
Figure 16:
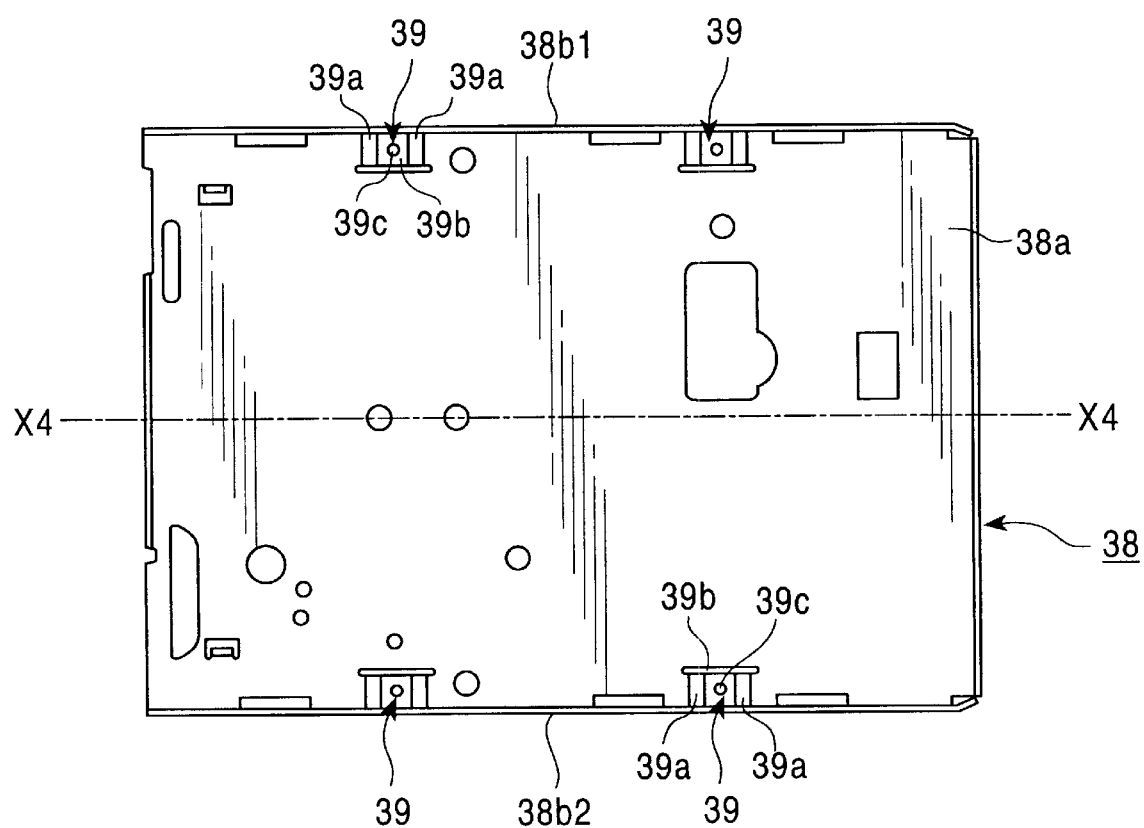
FIG. 16 is a plan view of the bottom cover of the conventional magnetic disk drive.
Figure 17:
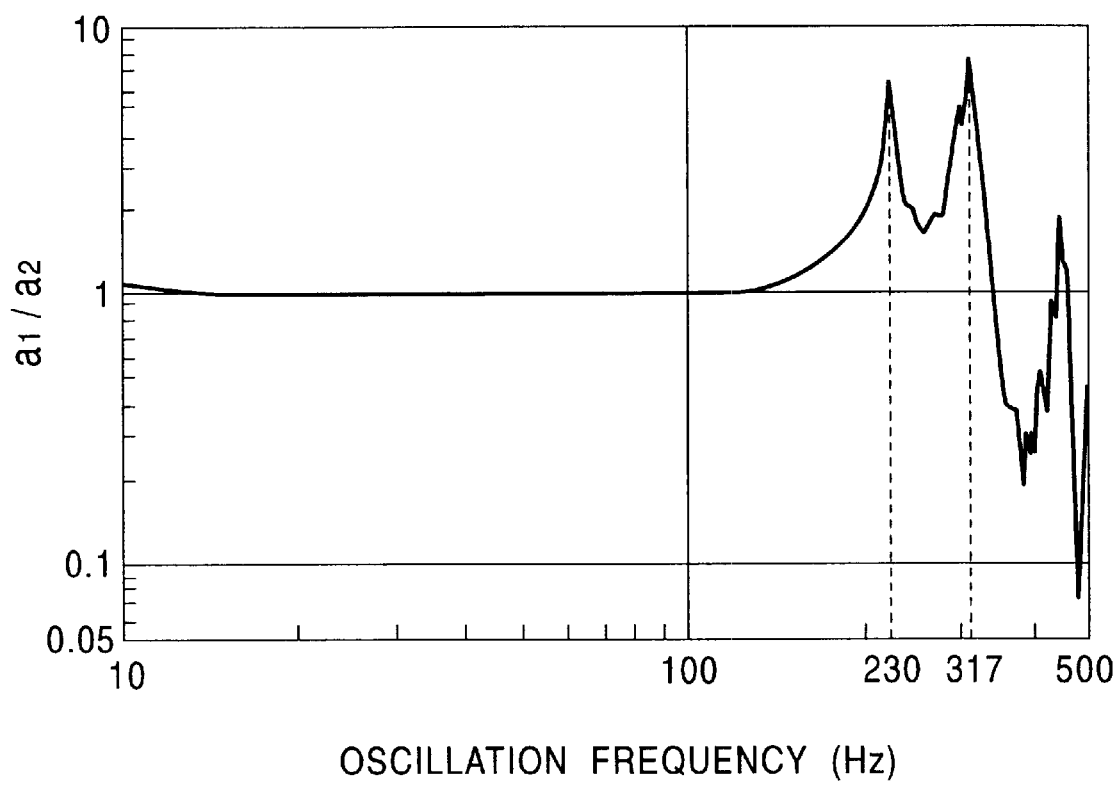
FIG. 17 shows measured values obtained when a body of the conventional magnetic disk drive is resonating.
Figure 18:
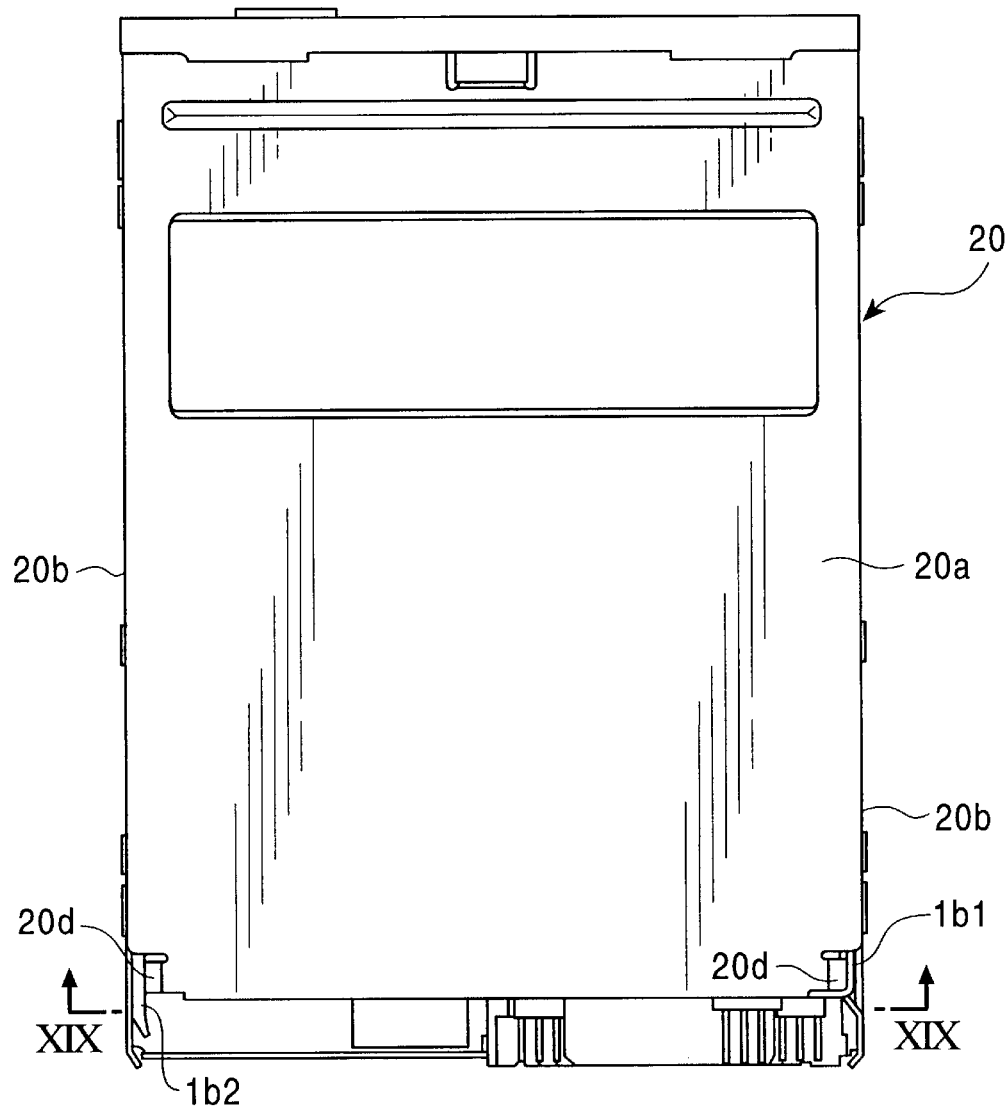
FIG. 18 is a plan view showing a state in which a top cover of a floppy disk drive in accordance with the present invention is mounted.
Figure 19:
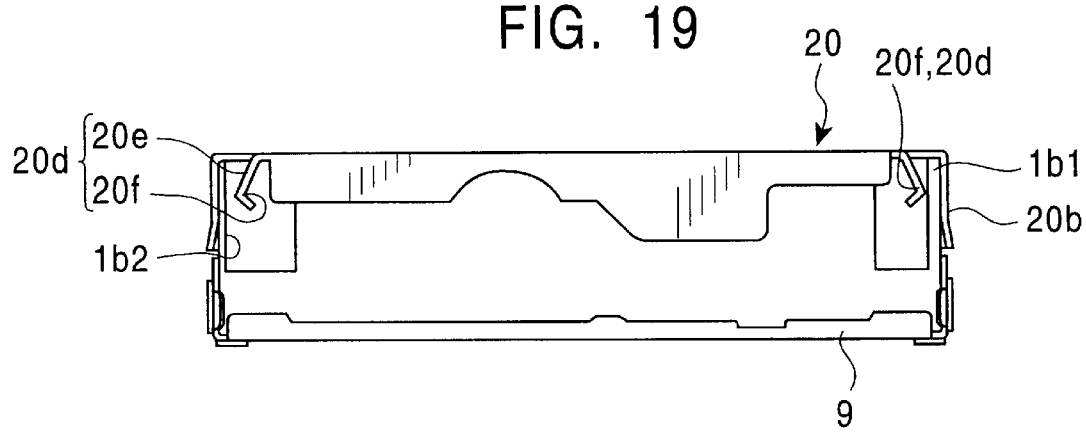
FIG. 19 is a schematic sectional view along line XIX—XIX of FIG. 18.
Figure 20:
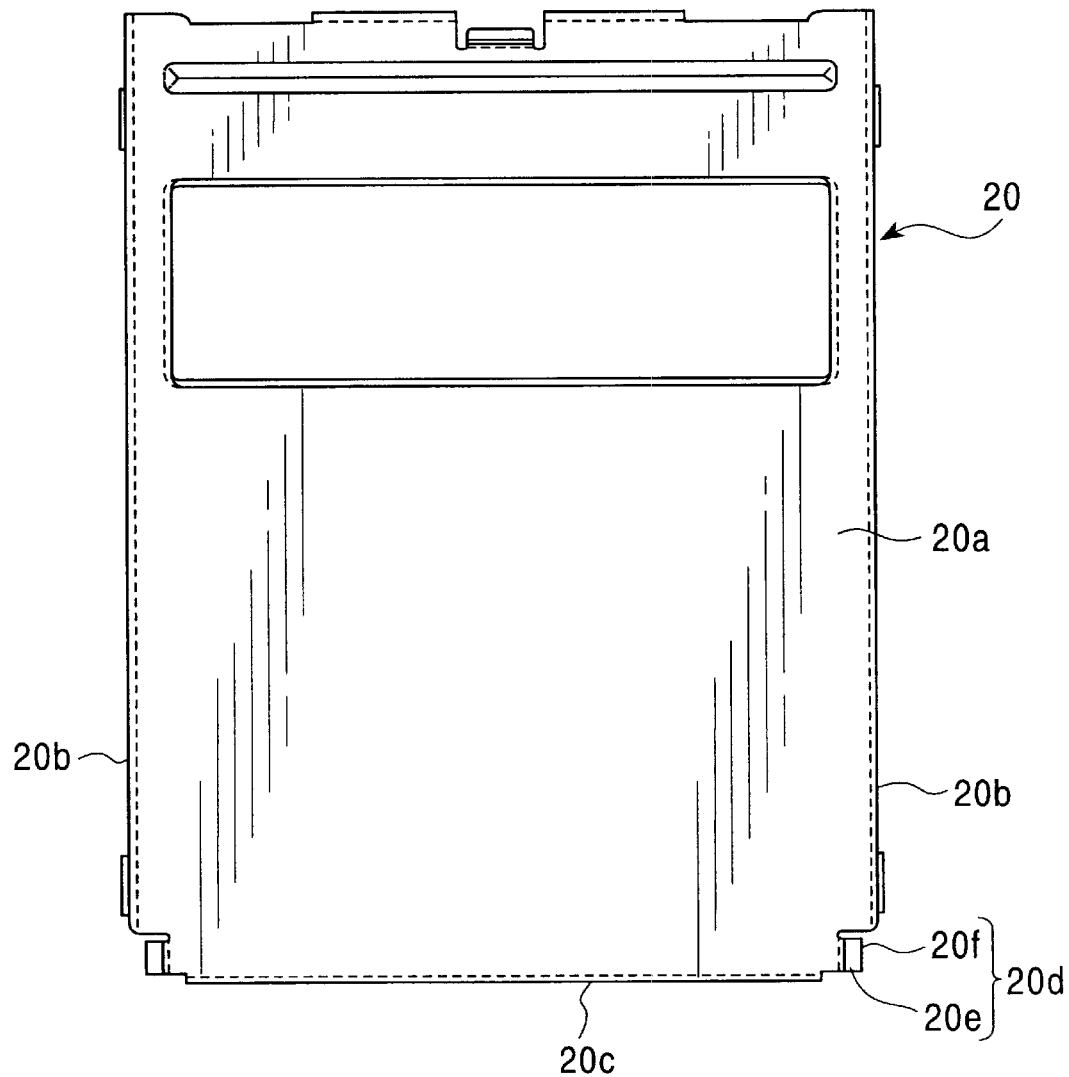
FIG. 20 is a plan view of the top cover of the floppy disk drive in accordance with the present invention.
Figure 21:
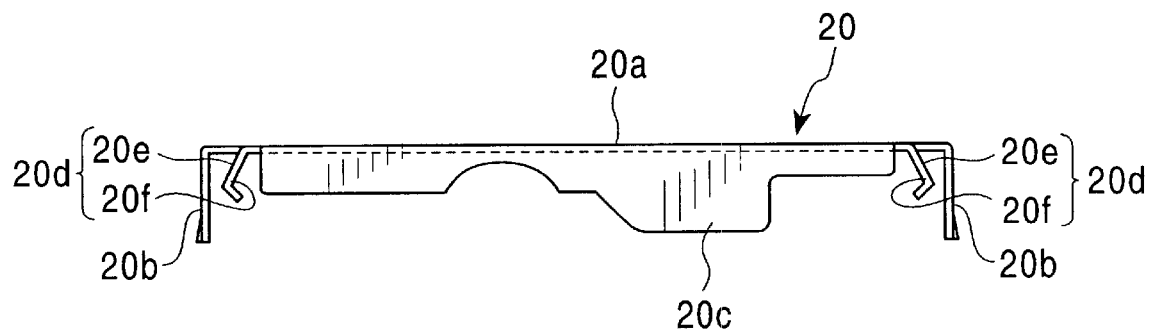
FIG. 21 is a front view of FIG. 20.

Hereunder, a description of a magnetic disk drive in accordance with the present invention will be given with reference to FIGS. 1 to 13. FIG. 1 is a plan view schematically showing the magnetic disk drive in accordance with the present invention. FIG. 2 is a left side view of the main portion as viewed from the direction of arrow II in FIG. 1, wherein a chassis and a bottom cover of the magnetic disk drive in accordance with the present invention are in an assembled state. FIG. 3 is a right side view showing the main portion as viewed from the direction of arrow III in FIG. 1, wherein the chassis and the bottom cover of the magnetic disk drive in accordance with the present invention are in an assembled state. FIG. 4 is an enlarged view of a portion enclosed in a circle IV of FIG. 2. FIG. 5 is an enlarged view of a portion enclosed in a circle V of FIG. 3. FIG. 6 is an enlarged view of a portion enclosed in a circle VI of FIG. 2. FIG. 7 is a perspective view of FIG. 6. FIG. 8 is a plan view of the chassis of the magnetic disk drive in accordance with the present invention. FIG. 9 is a plan view of the bottom cover of the magnetic disk drive in accordance with the present invention. FIG. 10 is a perspective view of the bottom cover of the magnetic disk drive in accordance with the present invention. FIG. 11 illustrates a twisted state of the chassis in the magnetic disk drive in accordance with the present invention. FIG. 12 illustrates a state in which the chassis of the magnetic disk drive in accordance with the present invention is parallel to a horizontal line H. FIG. 13 shows measured values obtained when a body of the magnetic disk drive in accordance with the present invention is resonating.

Referring to FIGS. 1 to 12, a chassis 1 is a thin iron plate, and comprises a substantially rectangular flat section 1a, side walls 1b1 and 1b2 formed vertically from both longer sides of the flat section 1a, and a side wall 1b3 formed by erecting vertically a portion of one of the shorter sides of the flat section 1a. As shown in FIGS. 6 and 7, at a boundary between the side wall 1b1 and the flat section 1a, a hook-shaped stopper hole 1c1 is formed in the side wall 1b1 so that a portion thereof reaches the flat section 1a. In addition, a rectangular insertion hole 1c2 is formed in the flat section 1a so as merge into a portion of the stopper hole 1c1. Accordingly, a hole 1c is formed. When the stopper hole 1c1 is formed, a lower edge 1c3 and an upper edge 1c4 are formed at the side wall 1b1 so as to face the stopper hole 1c1. At an opposite location of the side wall 1b2 are also formed similarly shaped hole 1c, and a stopper hole 1c1, an insertion hole 1c2, a lower edge 1c3, and an upper edge 1c4.

As shown in FIG. 8, near a boundary between the flat section 1a and the side wall 1b1 and near a boundary between the flat section 1a and the side wall 1b2 are formed, respectively, recess-shaped holding sections 2 and 3 at locations displaced opposite to the side wall 1b3. With a longitudinal center line X1—X1 being disposed between the holding sections 2 and 3, the holding sections 2 and 3 are symmetrically formed by indenting portions of the flat section 1a from the top side to the bottom side.

The holding section 2 includes a tapering section 2a and a pedestal 2b which is a top portion formed continuously with the tapering section 2a and formed parallel to the flat surface corresponding to the flat section 1a, with a hole 2c vertically passing through substantially the center of the pedestal 2b. Similarly, the holding section 3 includes a tapering section 3a and a pedestal 3b which is a top portion formed continuously with the tapering section 3a and formed parallel to the flat surface corresponding to the flat section 1a, with a hole 3c vertically passing through substantially the center of the pedestal 3b.

As shown in FIG. 1, a head transporting device 4 comprises a head carriage 5 including a head arm for carrying a magnetic head (not shown) at an end thereof, a guide shaft 6 inserted into the head carriage 5, and a stepping motor 7 to which one end of the guide shaft 6 is fitted. The stepping motor 7 allows the head carriage 5 to move in a longitudinal direction of the chassis 1. The head transporting device 4 inserted into a hole (not shown) formed in the side wall 1b3 is secured to the chassis 1 using a desired mounting means such as screwing.

A spindle motor 8 is mounted to the flat section 1a of the chassis 1 from below using a desired mounting means such as screwing. Although not shown, a top cover described below and other component parts (not shown) are mounted to the chassis 1 to form a body A.

As shown in FIGS. 9 and 10, a bottom cover 9 is a thin iron plate, and comprises a substantially rectangular bottom plate 9a, side walls 9b1 and 9b2 erected vertically from both longer sides of the bottom plate 9a, and a wall 9b3 formed by slightly bending a portion of one of the shorter sides of the bottom plate 9a. Very small, rectangular holes are formed in the side walls 9b1 and 9b2, with protrusions 9c which protrude inwardly from the respective holes being formed by bending.

Near a boundary between the bottom plate 9a and the side wall 9b1, and near a boundary between the bottom plate 9a and the side wall 9b2 are formed, respectively, protruding holding sections 10 and 11 at locations displaced opposite to the bent wall 9b3. With a longitudinal center line X2—X2 being disposed between the holding sections 10 and 11, the holding sections 10 and 11 are symmetrically formed by indenting portions of the bottom plate 9a from the bottom side to the top side. The holding section 10 includes a tapering section 10a and a first pedestal 10b which is a top portion formed continuously with the tapering section 10a, with a hole 10c vertically passing through substantially the center of the first pedestal 10b.

As shown in FIG. 4, the first pedestal 10b has an inclined surface which inclines in a direction opposite to the bent wall 9b3. As shown in FIG. 5, the holding section 11 includes a tapering section 11a and a second pedestal 11b which is a top portion formed continuously with the tapering section 11a, with a hole 11c vertically passing through substantially the center of the second pedestal 11b. However, the top surface of the second pedestal 11b is formed parallel to the flat surface of the bottom plate 9a.

Near a corner where the side wall 9b2 and the bent wall 9b3 are adjacent each other, three engaging portions 12, 14, and 14 and one stopper portion 13, formed by forming cuts and bending portions formed by the cuts, are formed in the bottom plate 9a so as to protrude from the top surface of 21 the bottom plate 9a. More specifically, there are formed the engaging portion 12 whose end is bent by an angle of substantially 90 degrees, the stopper portion 13 formed between the engaging portion 12 and the bent wall 9b3 so as to protrude obliquely upward from the bottom plate 9a, and the engaging portions 14 whose ends are bent by an angle of substantially 90 degrees disposed at two locations in a direction perpendicular to a line connecting the engaging portion 12 and the stopper portion 13.

A spring 15 is a thin metallic plate such as galvanized sheet iron, and includes a substantially rectangular base 15a, and a wall 15b bent from the base 15a, with a substantially rectangular hole 15c being formed in the base 15a, and a doglegged section 15d extending from one edge of the hole 15c.

As shown in FIG. 3, the spring 15 is mounted to the bottom cover 9 as a result of fitting the base 15a thereof to the engaging portions 12, 14, and 14 of the bottom cover 9. Here, the stopper portion 13 at the bottom cover 9 protrudes from the other edge of the hole 15c.

As shown in FIGS. 2 and 3, the bottom cover 9 is mounted to the chassis 1 so as to cover the bottom surface side of the chassis 1. More specifically, as shown in FIGS. 6 and 7, the protrusion 9c formed at the wall 9b1 of the bottom cover 9 is inserted into the stopper hole 1c1 formed in the side wall 1b1 of the chassis 1 from the insertion hole 1c2 in the hole 1c formed in the flat section 1a of the chassis 1. By displacing the chassis 1 and the bottom cover 9 in the longitudinal direction from each other, the protrusion 9c is placed and positioned at the lower edge 1c3 of the stopper hole 1c1. As shown in FIGS. 4 and 5, at this location, the first pedestal 10b of the holding section 10 of the bottom cover 9 and the pedestal 2b of the holding section 2 of the chassis 1 are in contact with, that is, abutted against each other. The second pedestal 11b of the holding section 11 of the bottom cover 9 and the pedestal 3b of the holding section 3 of the chassis 1 are similarly abutted against each other. In addition, the hole 10c in the holding section 10 of the bottom cover 9 and the hole 2c in the holding section 2 of the chassis 1 are in a connected state. In the connected state, a holding means, such as the screw 16, is inserted to secure the holding sections 2 and 10. On the other hand, the hole 11c in the holding section 11 of the bottom cover 9 and the hole 3c in the holding section 3 of the chassis 1 are similarly in a connected state. In the connected state, a holding means, such as a screw 17, is inserted to secure the holding sections 3 and 11 together. Here, the screws 16 and 17 serving as holding means are positioned on a line Y—Y which extends perpendicular to a line X—X extending in the direction of movement of the head carriage 5 and which is displaced at the spindle motor 8 side from a line G—G passing through the center of gravity of the body A. They are symmetrical with respect to the line X—X passing through the center of gravity.

Here, although the chassis 1 is subjected to an upward urging force F (see FIG. 11) as a result of being resiliently pressed by the spring 15 disposed on the bottom cover 9 and near the corner where the side wall 1b2 and the side wall 1b3 are adjacent each other, the protrusions 9c at the bottom cover 9 serving as restricting means are confined within a predetermined height as a result of bringing them into contact with the lower edges 1c3 of their corresponding stopper holes 1c2 of the chassis 1.

Here, a slight gap 1c 5 is formed between each upper edge 1c4 of the corresponding stopper hole 1c1 and each protrusion 9c. The chassis 1 is rotatable with respect to the bottom cover 9 within the gaps 1c5, with the hole 2c in the holding section 2 and the hole 3c in the holding section 3 serving as fulcra, and the line Y—Y which connects the fulcra and which is parallel to the line G—G passing through the center of gravity serving as an axis. When the chassis 1 rotates towards the bottom cover 9 side, it rotates in opposition to the resiliency of the spring 15, but its movement is restricted because an end of a bent section 15d of the spring 15 bumps into the stopper portion 13.

The relationship between the chassis 1 and the bottom cover 9 is described using FIGS. 11 and 12. According to FIG. 11, the portion of the chassis 1 near the corner where the side wall 1b2 and the side wall 1b3 are adjacent each other is subjected to a predetermined urging force F by the spring 15, and a nearby portion thereof is twisted by a predetermined angle α and forced upward with a predetermined displacement from a horizontal line H parallel to a shorter side of the chassis 1. In this state, when the chassis 1 is rotated with the line Y—Y which connects the fulcrum serving as an axis, a torque B is produced in the direction in which the chassis 1 is forced upward, so that it rotates without the shorter side being parallel to the horizontal line H. In the embodiment of the present invention shown in FIG. 12, the top surface of the first pedestal 10b of the holding section 10 of the bottom cover 9 located on a diagonal line from a location near the corner where the side walls 1b2 and 1b3 are adjacent each other is an inclined surface which inclines in a direction opposite to the bent wall 9b3. Therefore, when the chassis 1 is mounted to the bottom cover 9 with the screw 16, a force which lifts a portion near the corner where the side walls 1b1 and 1b3 are adjacent each other is exerted to the chassis 1. As a result, both corners of the chassis 1 are lifted upward in a similar way, so that the chassis 1 is horizontally inclined from the horizontal line H, and is made rotatable while the shorter side is parallel to the horizontal line H.

As shown in FIG. 13, an evaluation of the vibration of the body A was carried out by vibrating the entire magnetic disk drive of the embodiment of the present invention and changing the oscillation frequency thereof using a servo analyzer. In FIG. 13, the vertical axis represents a ratio in which an output acceleration a1 of the body A is divided by an acceleration a2 input to the magnetic disk drive (a1/a2), and the horizontal axis represents the oscillation frequency (in Hz).

According to FIG. 13, it can be seen that the level of a1/a2 increases smoothly at 137 Hz. In addition, it can be seen that the chassis 1 is prevented from resonating near 300 Hz at which frequency the read/write operations are particularly adversely affected.

This result was obtained because there were used the structure in which the body A is mounted to and supported by the bottom cover 9 at locations displaced parallel to the line G—G through which the center of gravity passes, and both shorter sides of the body A were made rotatable with respect to the bottom cover 9, with the line Y—Y connecting the fulcra of the body A serving as an axis. In other words, the result was obtained due to the following reason. When the entire magnetic disk drive is vibrated, the vibration, in general, concentrates near the center of gravity of the body A. Therefore, when, at a location displaced from the center of gravity of the body A, that is, with the line Y—Y used as an axis, both shorter sides of the body A are made rotatable, it is possible to absorb more vibration, and the spring 15 acts to absorb vibration exerted in a direction in which the chassis 1 is brought towards the bottom cover 9.

A description of a top cover will be given with reference to FIGS. 18 to 21. A top cover 20 is formed of a metallic plate material and is formed by cutting and bending. The top cover 20 includes a substantially rectangular top wall 20*a*, side walls 20*b*, 20*b*, and 20*c* extending substantially perpendicular (downward) from three directions of the periphery of the top wall 20*a*, a plurality of (for example, four) rectangular holes (not shown) formed in the side walls 20*b*, and substantially doglegged resiliently contacting sections 20*d* disposed at the corners at one side end of the top wall 20*a* and extending in substantially the same direction as the side walls 20*b*. The resiliently contacting sections 20*d* each include an inclined surface 20*e* which inclines from the top wall 20*a* to its corresponding side wall 20*b*, and a contact section 20*f* formed at a free end side of its corresponding inclined surface 20*e*. Each entire resiliently contacting section 20*d* is resilient.

The top cover 20 is disposed so as to cover a top open portion of the chassis 1. Here, the contact sections 20*f* of the corresponding resiliently contacting sections 20*d* resiliently contact the inside surfaces of corresponding side walls $1b_1$ and $1b_2$ of the chassis 1. The inside surfaces of the side walls 20*b* of the top cover 20 contact the outside surfaces of the side walls $1b_1$ and $1b_2$. The side walls $1b_1$ and $1b_2$ are constructed so as to be sandwiched by the corresponding resiliently contacting sections 20*d* and the corresponding side walls 20*b*. The chassis 1 and the top cover 20 are in electrical conduction with respect to each other.

In this state, the resiliently contacting sections 20*d* of the top cover 20 are constructed so as to be disposed near a signal line (not shown) and a magnetic head incorporated in the chassis 1. Thus, there is provided a structure which allows the magnetic head and the signal line to be more reliably shielded by the top cover 20. The resiliently contacting sections 20*d* are provided near the magnetic head because the magnetic head is easily affected by external electromagnetic waves. The most effective way to reduce the effects of external electromagnetic waves on the floppy disk drive is to shield the portions near the magnetic head.

The resiliently contacting sections 20*d* are formed at the corresponding corners of the top wall 20*a* because, when a press die for forming the top cover 20 is used to form the resiliently contacting sections 20*d* at the corresponding corners, it becomes easier to form the resiliently contacting sections 20*d* with the press die than when the resiliently contacting sections 20*d* are formed at other locations.

The bottom cover 9 is disposed so as to cover the bottom open side of the chassis 1.

In this state, side walls $9b_1$ and $9b_2$ of the bottom cover 9 are brought into contact with the side walls $1b_1$ and $1b_2$ of the chassis 1 as a result of, for example, firmly fitting them thereto, whereby they are brought into electrical conduction with each other.

Accordingly, the open sections of the chassis 1 in the vertical direction are covered by the top cover 20 and the bottom cover 9, respectively. In this state, the free end portions of the side walls 20*b* of the top cover 20 are disposed so as to oppose the free end portions of the side walls $9b_1$ and $9b_2$ of the bottom cover 9.

The chassis 1, the top cover 20, and the bottom cover 9 are in electrical conduction with each other, and are constructed so that the effects of external electromagnetic waves on the signal wire (not shown) and the magnetic head incorporated in the chassis 1 are made less by the top and bottom covers 20 and 9.

Window margin characteristics under the environment of a CRT (cathode ray tube: display device) of a floppy disk drive is given below as data which supports the fact that shielding the portions near the aforementioned magnetic head is the most effective way to reduce the effects of external electromagnetic waves on the floppy disk drive.

Raw data reproduced by the floppy disk drive is divided into data and clock by a window signal produced by a data separator. The window margin refers to the extra time before and after the raw data including bit shaking (forward-and-backward shaking with respect to a reference location) with respect to the width of the window signal.

This window margin characteristic indicates that the longer the length of time, the smaller the effects of external electromagnetic waves.

Figure 22:
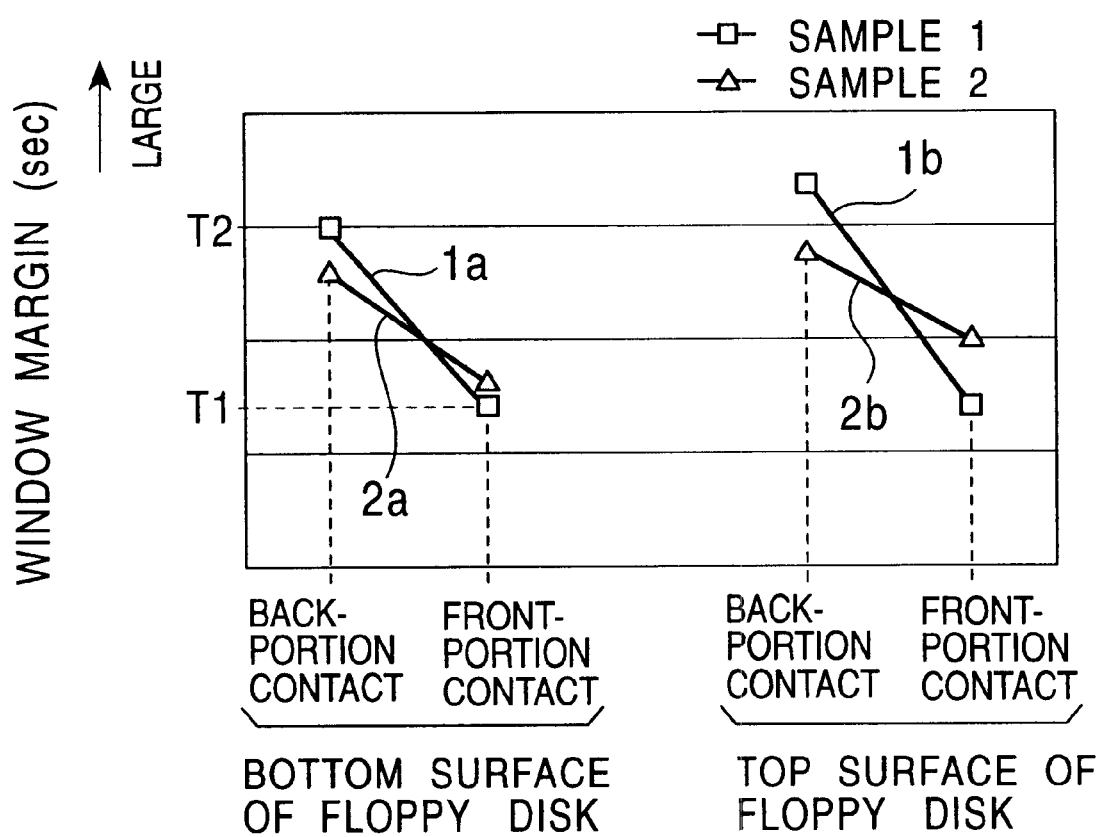
FIG. 22 illustrates a graph showing the window margin characteristics under the environment of a CRT of the floppy disk drive.

FIG. 22 illustrates the window margin characteristics under the environment of a CRT of a floppy disk.

More specifically, FIG. 22 shows the window margin characteristics of two floppy disk drives, a sample 1 floppy disk drive and a sample 2 floppy disk drive. Experiments were carried out by forming the resiliently contacting sections 20*d* at different locations. Graphs 1*a* and 2*a* each show the characteristic of the bottom surface (side 0) of a floppy disk (FD), while graphs 1*b* and 2*b* each show the characteristic of the top surface (side 1) of the floppy disk (FD).

Back-portion contact and front-portion contact shown along the horizontal axis indicate the locations where the resiliently contacting sections 20*d* contact the chassis as viewed from the FD insertion opening (front portion) side. More specifically, in the back-portion contact, the resiliently contacting sections 20*d* contact the chassis 1 at locations near the magnetic head, whereas, in the front-portion contact, the resiliently contacting sections 20*d* contact the chassis 1 at locations away from the magnetic head.

For the window margin (in sec) along the vertical axis, the time is longer towards the upper side of the graph.

The graph 1*a* is described. Regarding each characteristic at the bottom side of the floppy disk, each front-portion contact window margin is T1 seconds, whereas, each back-portion window margin is T2 seconds (T2>T1). This shows that, in each back-portion contact, each window margin time (T in seconds) is longer, with T2−T1 being equal to, for example, approximately 70 nsec.

Even in the graphs 1*b*, 2*a*, and 2*b*, each window margin (T in seconds) is longer for each back-portion contact (that is, when each of the resiliently contacting sections 20*d* contact a location near the magnetic head) than for each front-portion contact. Each back-portion contact window margin is, for example, approximately 40 to 100 nsec longer than the corresponding front-portion contact window margin. This shows that considerable extra time can be provided with respect to electromagnetic waves from the CRT.

It is obvious that the present invention is not limited to the above-described embodiment of the magnetic disk drive. For example, although, in the embodiment of the present invention, the spring 15 is used as a first means for rotatably holding the chassis 1, the spring 15 does not have to be used if it can be rotatably held only by the holding sections 2 and 10 and 3 and 11. In this case, the chassis 1 is rotatable with the line Y—Y as an axis.

In another structure, the spring 15 is not provided at the bottom cover 9. Instead, the top surfaces of the first pedestal 10b and the second pedestal 11b of the corresponding holding sections 10 and 11 of the bottom cover 9 are formed into inclined surfaces which incline in directions opposite to the bent wall 9b3. In this structure, the other structural features are the same. In this case, since an upward force is exerted to the head carriage 5 side of the chassis 1, the chassis 1 is urged upward at all times, so that the same effect as that obtained when the spring is provided is obtained.

In the embodiment, the spring 15 is disposed near the corner where the side wall 9b2 and the bent wall 9b3 are adjacent each other. However, when the spring 15 is disposed directly below a location situated at substantially the center in a shorter side direction, that is, directly below the head carriage 5, the first pedestal 10b of the holding section 10 of the bottom cover 9 is disposed parallel to the flat surface of the bottom plate 9a. In this structure, the other structural features are the same. In this case, the urging force F is uniformly exerted to the chassis 1, so that twisting of the chassis 1 does not occur, making it possible to form the first pedestal 10b flat.

Although, in the embodiment, the spring 15 exerts an urging force which acts in a direction in which the bottom cover 9 and the chassis 1 are separated from each other, a spring which exerts an urging force which acts in a direction in which the bottom cover 9 and the chassis 1 are brought closer together may also be provided. In this case, since the urging force acts in a direction in which the chassis 1 is brought towards the bottom cover 9, the plate spring functions to absorb shock produced by vibration acting in a direction in which the chassis 1 is separated from the bottom cover 9. The spring 15 may be, for example, a coil spring or a wire spring.

It is preferable that a resilient member, such as rubber or sponge, be bonded to the lower edge 1c3 and the upper edge 1c4 of the stopper hole 1c1 in each hole 1c in the chassis 1.

According to the present invention, there is provided a magnetic disk drive comprising: a body including a chassis formed of a flat plate and at least a spindle motor and a head carriage that are mounted to the chassis; a bottom cover mounted so as to cover the chassis; and holding means for holding the chassis and the bottom cover; wherein the holding means is disposed on a support line which intersects at right angles a line passing through the center of gravity of the body and extending in a direction of movement of the head carriage, the support line being displaced from the center of gravity of the body; and wherein the body is rotatable with respect to the bottom cover, with the support line serving as an axis. Therefore, when vibration or shock is applied to the body of the magnetic disk drive, the chassis rotates at a location displaced from the center of gravity of the body, so that the vibration or shock applied near the center of gravity of the body can be reduced. In addition, the vibration or shock transmitted to, for example, the spindle motor or the head carriage mounted to the chassis can be reduced, making it possible to provide a magnetic disk drive which can perform highly reliable read/write operations.

Two such holding means may be provided at two locations on the support line, with the line passing through the center of gravity being disposed therebetween. Therefore, the chassis rotates stably, making it possible to reduce the vibration and shock transmitted to, for example, the spindle motor or the head carriage mounted to the chassis, so that a magnetic disk drive which performs highly reliable read/write operations can be provided.

The holding means may be symmetrically disposed at the two locations with respect to the line passing through the center of gravity. Therefore, the chassis rotates parallel to a direction perpendicular to the direction of movement of the head carriage, so that vibration or shock transmitted to, for example, the spindle motor or the head carriage mounted to the chassis can be optimally reduced, making it possible to provide a magnetic disk drive which performs highly reliable read/write operations.

The holding means may be disposed on the support line displaced at a spindle motor side. Therefore, the chassis rotates with the support line disposed at a location separated from the head carriage serving as an axis. Consequently, vibration or shock transmitted to the head carriage from the outside can be absorbed, making it possible to provide a magnetic disk drive which performs highly reliable read/write operations.

The magnetic disk drive comprising the holding means may further comprise a resilient member for absorbing shock at the chassis, wherein, at a location displaced from the support line, the resilient member is disposed between the chassis and the bottom cover. Therefore, a fixed urging force is applied to the chassis, so that the urging force can be used to absorb any vibration or shock from the outside, making it possible to provide a magnetic disk drive which performs highly reliable read/write operations.

The magnetic disk drive comprising the holding means may further comprise a resilient member for absorbing shock produced at the chassis, wherein, at a location displaced from the support line, the resilient member is disposed at a head carriage mounting side between the chassis and the bottom cover. Therefore, the support line and the resilient member are disposed, with the center of gravity of the body being disposed therebetween. Therefore, it is possible to effectively reduce the vibration and shock applied to a location near the center of gravity of the body.

The magnetic disk drive comprising the holding means may be such that the resilient member performs an urging operation in a direction in which the bottom cover and the chassis are separated from each other or in a direction in which the bottom cover and the chassis are brought toward each other. Therefore, it is possible to reduce the vibration or shock coming from the outside exerted in the direction in which the bottom cover and the chassis are separated from each other or in the direction in which they are brought towards each other.

The magnetic disk drive comprising the holding means may further comprise restricting means for restricting a rotational movement of the chassis, with the holding means serving as a fulcrum. Therefore, the chassis can be positioned at a predetermined height, and measures can be taken against vibration of an amplitude within a predetermined range.

The magnetic disk drive comprising the holding means may be such that the restricting means comprises a hole formed in either one of the bottom cover and the chassis and a protrusion formed in either of the other of the bottom cover and the chassis. Therefore, using a simple method, the hole and the protrusion can be precisely engaged, so that a highly reliable magnetic disk drive which can be properly mass-produced can be provided.

The magnetic disk drive comprising the holding means may be such that, in the direction of movement of the head carriage, the chassis while being tilted with respect to the bottom cover, is held by the holding means, and the tilted chassis while being displaced is stopped by the restricting means for restricting a rotational motion of the chassis with the holding means as a fulcrum. Therefore, by making the chassis possess resiliency at all times, it becomes unnecessary to provide the resilient member, thus making it possible to provide a low-cost magnetic disk drive.

The magnetic disk drive comprising the holding means may be such that either the chassis or the bottom cover includes a first pedestal having an inclined surface formed at a top portion thereof; the holding means is situated at the first pedestal; and either the chassis or the bottom cover is brought into contact with the inclined surface in order to dispose the chassis in a tilted state with respect to the bottom cover. Therefore, using a simple method, the chassis can be placed in an inclined state with respect to the bottom cover, thus making it possible to provide a low-cost magnetic disk drive.

The magnetic disk drive comprising the holding means may be such that two such first pedestals are provided at two locations on the support line, with the line passing through the center of gravity being disposed therebetween. Therefore, it is possible to tilt the chassis parallel to a direction perpendicular to the direction of movement of the head carriage, thereby allowing the chassis to rotate parallel thereto. Consequently, it is possible to reduce the vibration or shock transmitted to, for example, the spindle motor or the head carriage mounted to the chassis, so that a magnetic disk drive which performs highly reliable read/write operations can be provided.

The magnetic disk drive comprising the holding means may be such that either the chassis or the bottom cover includes a second pedestal having a top surface which is parallel to a flat surface of either the chassis or the bottom cover; the holding means is situated at the second pedestal; on the support line, the second pedestal is disposed on one side of the line passing through the center of gravity, and the first pedestal is disposed on the other side of the line passing through the center of gravity; either the chassis or the bottom cover is brought into contact with the inclined surface and the top surface in order to hold the chassis and the bottom cover by the holding means; and the magnetic disk drive further comprises a resilient member for absorbing shock at the chassis, in which, at a location separated from the second pedestal between the chassis and the bottom cover, the resilient member is disposed towards the second pedestal from the line passing through the center of gravity. Therefore, when an urging force is applied to the chassis by the resilient member, it is possible to design the magnetic disk drive with greater freedom. In addition, since the chassis rotates parallel to a direction perpendicular to the direction of movement of the head carriage, it is possible to optimally reduce the vibration or shock transmitted to, for example, the spindle motor or the head carriage mounted to the chassis, so that a magnetic disk drive which performs highly reliable read/write operations can be provided.

What is claimed is:

1. A magnetic disk drive comprising:
   a body including a chassis formed of a flat plate and at least a spindle motor and a head carriage that are mounted to the chassis;
   a moving mechanism to move the carriage in a longitudinal direction of the chassis;
   a bottom cover mounted to cover the chassis; and
   a holding mechanism to hold the chassis to the bottom cover;
   wherein the holding mechanism is disposed on a support line, the support line being displaced from the center of gravity of the body; and
   wherein the body is rotatable with respect to the bottom cover, with the support line serving as an axis.

2. A magnetic disk drive according to claim 1, wherein two such holding mechanisms are provided at two locations on the support line, with a line passing through the center of gravity and being parallel to a direction of movement of the carriage being disposed therebetween.

3. A magnetic disk drive according to claim 2, wherein the holding mechanisms are symmetrically disposed at the two locations with respect to the line passing through the center of gravity.

4. A magnetic disk drive according to claim 1, wherein the holding mechanism is disposed on the support line displaced at a spindle motor side.

5. A magnetic disk drive according to claim 4, further comprising a resilient member to absorb shock produced at the chassis, wherein, at a location displaced from the support line, the resilient member is disposed at a head carriage mounting side between the chassis and the bottom cover.

6. A magnetic disk drive according to claim 1, further comprising a resilient member to absorb shock at the chassis, wherein, at a location displaced from the support line, the resilient member is disposed between the chassis and the bottom cover.

7. A magnetic disk drive according to claim 6, wherein the resilient member performs an urging operation in one of a direction in which the bottom cover and the chassis are separated from each other and a direction in which the bottom cover and the chassis are brought toward each other.

8. A magnetic disk drive according to claim 6, further comprising a restricting mechanism to restrict a rotational movement of the chassis, with the holding mechanism serving as a fulcrum.

9. A magnetic disk drive according to claim 8, wherein the restricting mechanism comprises a hole formed in either one of the bottom cover and the chassis and a protrusion formed in either of the other of the bottom cover and the chassis.

10. A magnetic disk drive according to claim 1, wherein, in the direction of movement of the head carriage, the chassis while being tilted with respect to the bottom cover, is held by the holding mechanism, and wherein the tilted chassis while being displaced is stopped by the restricting mechanism to restrict a rotational motion of the chassis with the holding mechanism as a fulcrum.

11. A magnetic disk drive according to claim 10, wherein one of the chassis and the bottom cover includes a first pedestal having an inclined surface formed at a top portion thereof; wherein the holding mechanism is situated at the first pedestal; and wherein one of the chassis and the bottom cover is brought into contact with the inclined surface to dispose the chassis in a tilted state with respect to the bottom cover.

12. A magnetic disk drive according to claim 11, wherein two such first pedestals are provided at two locations on the support line, with the line passing through the center of gravity being disposed therebetween.

13. A magnetic disk drive according to claim 11, wherein one of the chassis and the bottom cover includes a second pedestal having a top surface which is parallel to a flat surface of one of the chassis and the bottom cover; wherein the holding mechanism is situated at the second pedestal; wherein, on the support line, the second pedestal is disposed on one side of the line passing through the center of gravity, and the first pedestal is disposed on the other side of the line passing through the center of gravity; wherein one of the chassis and the bottom cover is brought into contact with the inclined surface and the top surface to hold the chassis and the bottom cover by the holding mechanism; and wherein the magnetic disk drive further comprises a resilient member to absorb shock at the chassis, in which, at a location separated from the second pedestal between the chassis and the bottom cover, the resilient member is disposed towards the second pedestal from the line passing through the center of gravity.

* * * * *